June 17, 1969  J. W. HERRLI  3,451,037
ELECTRICAL TERMINAL BLOCK

Filed Oct. 2, 1967

INVENTOR.
JACK W. HERRLI
BY M. A. Hobbs
ATTORNEY

June 17, 1969

J. W. HERRLI 3,451,037

ELECTRICAL TERMINAL BLOCK

Filed Oct. 2, 1967

INVENTOR.
JACK W. HERRLI
BY *M. A. Hobbs*
ATTORNEY

United States Patent Office 3,451,037
Patented June 17, 1969

3,451,037
ELECTRICAL TERMINAL BLOCK
Jack W. Herrli, Elkhart, Ind. 46514
Filed Oct. 2, 1967, Ser. No. 672,111
Int. Cl. H01r 33/72, 13/60, 7/12
U.S. Cl. 339—192                                      9 Claims

ABSTRACT OF THE DISCLOSURE

An electrical terminal block having a plurality of metal tubular members extending therethrough with recesses in the opposite ends thereof for receiving wires forming a connection therewith. The tubular members are provided with set screws for securing the wires in place in the recesses and holes are provided through the side of the block intersecting the tubular members for receiving the prongs of a plug or fixture for making an electrical connection with the tubular members. The terminal block nests in a portion of a mounting plate. The plate is secured to a ceiling-mounted outlet box.

---

In the conventional electrical outlet boxes used in building installations, the electrical wires are strung in the walls and/or ceiling structures and connected to the various fixtures, such as light sockets or cord outlets, at the outlet boxes, using screws to clamp the wires to the fixtures. If the circuit installation is to be extended to other outlet boxes, a connection with the incoming wires is made either by utilizing the screws to hold the wires together or by soldering and taping the wires in the outlet box. The connections with the fixtures and with the incoming wires are often difficult to make and to retain in a secure and safe condition and are difficult to change when new fixtures are installed in place of the original fixtures or when wires for additional outlet boxes are connected to the incoming wires. Further, the connections in the outlet box between the various wires and between the wires and fixtures are often difficult to inspect and repair. It is therefore one of the principal objects of the present invention to provide a terminal block for an electrical outlet box in which firm and dependable connections are quickly made between the incoming wires and the block and between the block and fixtures, and in which a connection can readily and reliably be made with the incoming wires and further lead wires for additional outlet boxes without soldering or taping the connections. The device includes a plurality of tubular contacts in the block, each having end recesses with set screws for securing lead wires therein; and one of the recesses has a plung prong-receiving hole. The block is nested in a mounting plate for support on an outlet box.

Another object of the invention is to provide a terminal block for outlet boxes, which can easily be installed and readily connected to the incoming and outgoing lines, and in which the fixtures can be conveniently connected to and removed from the block.

Still another object of the invention is to provide a relatively simple terminal block which accommodates a number of different connections, either through the block to the fixture or from the block to other outlet boxes, and which effects the connection by a simple set screw means which can effectively be inspected before the final assembly of the fixture onto the box is completed.

A further object is to provide a terminal block of the aforementioned type in which the fixture can be either wired directly and securely into the block for a permanent connection or plugged into the block for easy removal and replacement of other types of fixtures such as sockets or extension cords, and which can be adapted to various shaped boxes, such as square or octagon, and to plaster walls of various thicknesses.

Another object of the invention is to provide a terminal block for electrical outlet boxes, which is simple in construction and design, and highly versatile with respect to types of installations, and which is so constructed and designed that the hazard from shock and shorts in the outlet box is virtually eliminated.

Additional objects and advantages of the invention will become apparent from the following description and accompanying drawings, wherein.

Figure 1:
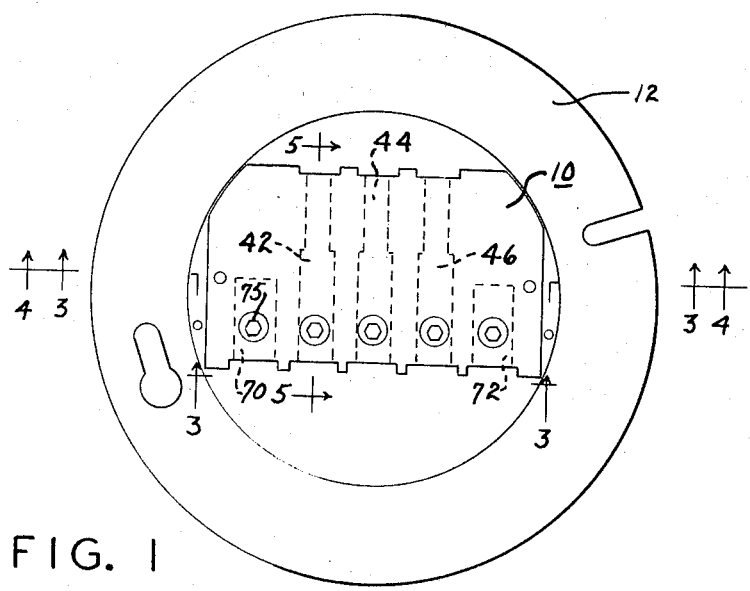
FIGURE 1 is a top plan view of the present terminal block showing it mounted in an electrical outlet box plate or cover.

Referring more specifically to the drawings, numeral 10 designates generally the present electrical terminal block, 12 and electrical outlet box plate on which the terminal block is mounted, and 14 an electrical outlet box of conventional design and construction. The box is shown mounted in a ceiling structure of a building, the ceiling being indicated by numeral 16 and consisting of rock lath 18 and plaster 20. The manner in which the outlet box is secured in place and the construction of the ceiling are well known and will not be described herein.

In the present installation, the outlet box 14 is secured in place flush with the outer surface of lathing 18, and plate 12 is secured thereto by screws and projects outwardly from the box and from the surface of the lathing the distance equal to the final thickness of the plaster layer 20 so that the outer edge of the plate is flush with the external surface of the plastered ceiling. The present electrical terminal block 10 is rigidly secured in place in plate 12 by screws 22 and 24 extending through inwardly projecting ears 26 and 28, respectively, of plate 12 and into threaded holes in the terminal block. A layer of insulating material 30 is preferably disposed between the inner flange 32 of plate 12 and the block so that the wires connected to the block within the box are shielded from the plate, and any foreign object or material inadvertently inserted in the box.

Figure 4:
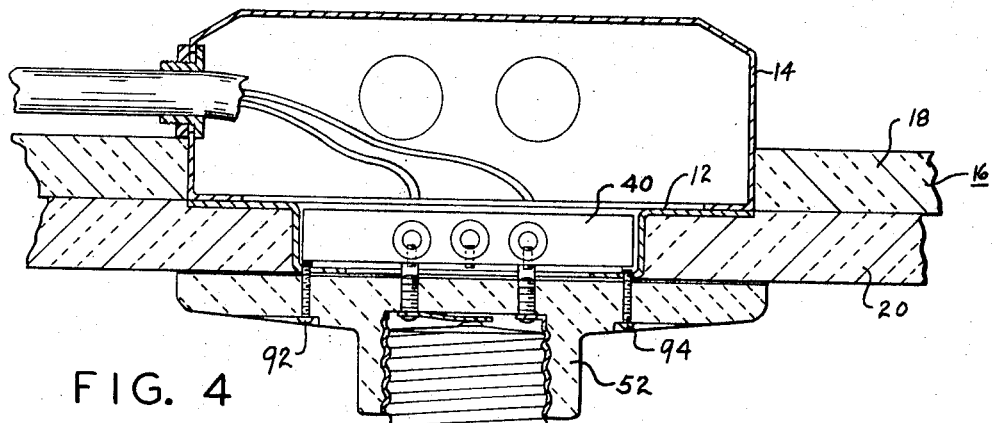
FIGURE 4 is a vertical cross sectional view of the present electrical outlet box containing the present terminal block showing the box and fixture attached thereto installed in the ceiling structure of a building.
Figure 5:
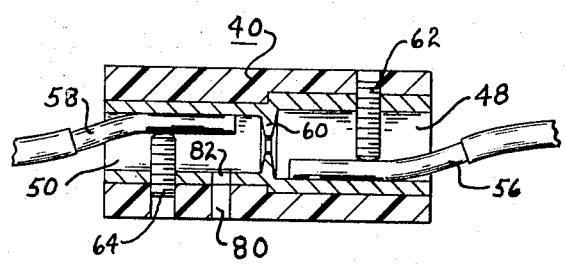
FIGURE 5 is an enlarged vertical cross sectional view of the present terminal block, the section being taken on line 5—5 of FIGURE 1.

The block consists of a plastic or ceramic body 40 having tubular shaped metal connectors 42, 44 and 46 embedded therein and extending from one longitudinal edge to the other. The tubular members, which are best illustrated in FIGURE 5, contain a recess 48 for the incoming wire and a recess 50 for the wire connected to a fixture such as that shown at numeral 52 in FIGURE 4, the one shown being a porcelain socket type for a light bulb 54. The tubular members 42, 44 and 46 are preferably constructed of brass or other good electrical conducting material and form a good electrical connection between the incoming wires 56 and the outgoing wires 58 to the fixture. In the construction illustrated in the drawing, a partition 60 is provided near the center of the tubular member in order to prevent the wires 56 and 58 from being extended beyond the proper position in the respective recesses 48 and 50. The incoming and outgoing wires 56 and 58 are secured in place in the recesses by set screws 62 and 64 threadedly received in holes in the respective tubular members, the set screws shown in the drawings containing sockets in their outer ends for Allen wrenches. The set screws retain the wires firmly in the respective recesses and prevent accidental dislodgment therefrom and, in making the installation, the wires are merely stripped of their insulation and inserted into the recesses in substantially a straight shape, thereby eliminating the need for forming, twisting or looping the wire to make the connection. The wires in the construction shown in the drawings may be connected to tubular members 42, 44, and 46 in various arrangements; however, the preferred manner is to use tubular members 42 and 44 for the live wires and tubular member 46 for the ground wire.

The present terminal block also contains cup-shaped members 70 and 72 embeded in body 40 in the same manner as the tubular members. However, the cup-shaped members do not extend through the block, but merely contain a recess 74 in the exposed end. The cup-shaped members receive the ends of the wires which are connected to form a continuous circuit through the outlet box to, for example, another outlet box, and the ends are held in place by the set screws 75 extending through the body into threaded bores in the side wall of the cup-shaped members. The set screws, which are of the Allen wrench type, clamp the wires firmly in the recess 74 with the stripped ends of the wires remaining substantially straight, in that normally only physical connection is all that is required to form a good electrical connection in the cup-shaped members. The two wires may be twisted together and/or may be soldered to form a bond between the wires if desired. While only two cup-shaped members are shown, the block may contain additional such members in order to provide a means for making a greater number of connections. Likewise, the number of tubular members may be varied to satisfy requirements.

Figure 6:
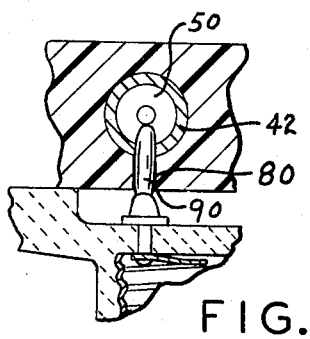
FIGURE 6 is a fragmentary cross sectional view illustrating a different type of connection between the terminal block and fixture.

The fixture 52 may be connected into the circuit by wires 58 extending into the tubular members. However, in the event it is desirable to change the fixtures or remove them for any purpose frequently, a plug-in type connection is possible with the present terminal block. A hole 80 is provided in the terminal block which extends inwardly through body 40 through a hole 82 in the respective tubular member. A banana type plug 90 is connected to the fixture, and when the fixture is installed, the plugs are slipped into holes 80 which frictionally retain the fixture in place on the outlet box. This type of connection is illustrated in FIGURE 6 and normally would be used as an alternate means from that shown in FIGURE 5 for connecting the fixture to the terminal block.

Figure 2:
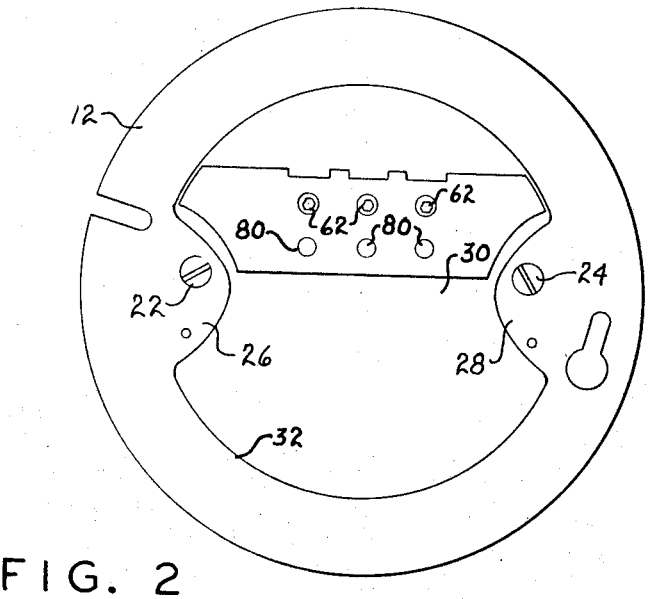
FIGURE 2 is a bottom view of the terminal block and plate shown in FIGURE 1.
Figure 3:
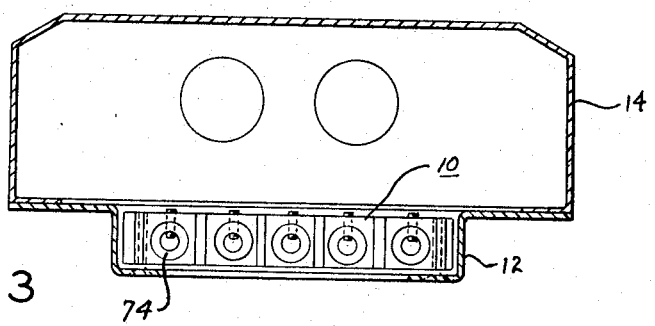
FIGURE 3 is a vertical cross sectional view of the terminal block and plate showing it mounted in an electrical outlet box, the section being taken on line 3—3 of FIGURE 1.

In making an installation using the present terminal block, the outlet box is installed in the conventional manner and the incoming and outgoing wires are connected to the box in the usual way. The block is secured to plate 12 and the ends of the wires are stripped and inserted in the respective recesses and secured in place by the set screws 62. The block is then secured in place in the box behind plate 12 by screws 22 and 24, and the fixtures are connected to the block either by wires 58 in recesses 50 or by the banana plugs 90 extending through holes 80 and 82 into the respective tubular members. The wires 58 can be easily inserted in the respective recesses 50 after block 10 has been secured in place within plate 12 by inserting the wires in the recesses and tightening the set screws 64 which are exposed on the under side of the plate as seen in FIGURE 2. Plate 12 is then secured in place on the box preparatory to the plastering operation. After the wires 58 have been connected to the block, the porcelain fixture is then secured to the plate by screws 92 and 94 extending through the porcelain fixture portion into threaded holes in plate 12. Block 10 can be removed from the box by removing screws 22 and 24, removing the insulating layer, and sliding the block through the opening in plate 12.

In the event the connection is to be made by plugs rather than by wires, the block is mounted in the same manner as described above; however, wires 58 are not connected to the block. The plugs, which are rigidly secured to the porecelain base of the fixture, are merely inserted in holes 80 where they make electrical contact with the tubular members 42, 44 or 46. If a connection to an additional outlet box is to be made in the installation, the wires therefor are connected in recesses 48 with the incoming wires for the instant outlet. However, if the box is being used merely to make a connection between incoming and outgoing wires without a connection with the fixture in the instant box, the cup-shaped members 70 and/or 72 are used in making the connection.

Some advantages of the present terminal block structure are the versatility with respect to the types of fixtures, the ease with which the fixtures can be interchanged, and the use of the terminal block directly as an outlet for an extension cord or the like. The holes 80 receive and retain banana type plugs from the end of the extension cord in the same manner as that illustrated in FIGURE 6. This interchangeability can be easily accomplished by simply unplugging the type of fixture shown in FIGURE 6 and inserting the plugs of the extension cord in holes 80 and 82. This plug-in structure can be used for various other types of fixtures, such as drops and surface type fixtures.

It is seen that effective and reliable electrical connections can be made merely by inserting the stripped ends of the wires in the respective recesses and securing them therein to form a good electrical contact with the tubular members and/or with other wires, by tightening set screws 62 and/or 64. Since the connection is firm and rigid, and the wires are left in substantially straight condition, good electrical contact is made between the wires and the tubular members, and little or no strain is placed on the connection by deformation of the wires which otherwise could result in a broken wire and loose connection.

While only one embodiment of the present terminal block and installation has been described in detail herein, various changes and modifications may be made without departing from the scope of the invention.

I claim:

1. An electrical outlet device comprising a body of electrical insulating material having two sides and two edges joined to said sides, a plurality of elongated members of electrical conducting material extending through said body from one edge to the other and having a recess in each end, set screws extending through the side wall of the elongated members into each recess for clamping an end of an electrical wire therein, and means defining a hole extending from one side of said body into one recess of each elongated member for receiving the prongs of a plug for making an electrical connection.

2. An electrical outlet device as defined in claim 1 in which said elongated members are tubular in shape.

3. An electrical outlet device as defined in claim 2 in which three of said elongated members are provided in said body.

4. An electrical outlet device as defined in claim 3 in which said tubular shaped members are constructed of brass.

5. An electrical outlet device as defined in claim 1 in which two cup-shaped members extend inwardly from one edge of said body in axial parallel relation with the axis of said elongated members and set screws are provided in said cup-shaped members for securing wires therein.

6. An electrical outlet device as defined in claim 1 in which said elongated members are tubular in shape and are of smaller diameter at one end than at the other end.

7. An electrical outlet device as defined in claim 6 in which said hole extending from one side of the body into one recess of each elongated member extends into the recess in the smaller diameter end of said tubular member.

8. An electrical outlet device as defined in claim 1 in which a metal plate having an outwardly extending center portion is provided for receiving said body and for mounting said body on an electrical outlet box.

9. An electrical outlet device as defined in claim 8 in which the set screws of one end of said elongated members extend from the box side of the block inwardly and the set screws of the other end of said elongated members extend from the opposite side inwardly.

References Cited

UNITED STATES PATENTS

| 1,481,278 | 1/1924 | Wood | 339—157 X |
| 1,934,581 | 11/1933 | Bach | 339—248 X |

FOREIGN PATENTS

| 849,262 | 9/1952 | Germany. |

RICHARD E. MOORE, *Primary Examiner.*

U.S. Cl. X.R.

339—122, 272